(12) United States Patent
Osawa et al.

(10) Patent No.: US 6,661,138 B2
(45) Date of Patent: Dec. 9, 2003

(54) VIBRATION GENERATING MOTOR

(75) Inventors: Fumihiko Osawa, Tokyo (JP); Takashi Osumi, Tokyo (JP); Takeshi Shinoda, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 21 days.

(21) Appl. No.: 10/109,590

(22) Filed: Mar. 28, 2002

(65) Prior Publication Data
US 2002/0145347 A1 Oct. 10, 2002

(30) Foreign Application Priority Data
Mar. 29, 2001 (JP) .................................... 2001-094902

(51) Int. Cl.[7] .......................... H02K 7/075; H02K 7/065
(52) U.S. Cl. ............................................ 310/81; 310/81
(58) Field of Search .................. 310/81, 89, 156.38, 310/67 R; H02K 7/075, 7/065

(56) References Cited

U.S. PATENT DOCUMENTS 6,265,838 B1 * 7/2001 Won ............................ 310/114
6,326,711 B1 * 12/2001 Yamaguchi .................. 310/81

FOREIGN PATENT DOCUMENTS

JP          062398      *  2/2000  ......... H02K/7/075

\* cited by examiner

*Primary Examiner*—Nestor Ramirez
*Assistant Examiner*—Iraj A. Mohandesi
(74) *Attorney, Agent, or Firm*—Darby & Darby

(57) ABSTRACT

The present invention relates a vibration generating motor providing simple and fast assembly, and ready recycling. A motor includes a plurality of rotors around a rotary shaft, a plurality of coil winding portions on respective rotors, and a coil on each respective coil winding portion. At least a two part weight is positioned between selected coil winding portions and has an seperably upper and lower part, allowing weight maximization at low cost while conserving space.

9 Claims, 9 Drawing Sheets

VIBRATION GENERATING MOTOR

BACKGROUND TO THE PRESENT INVENTION

1. Field of the Invention

The present invention relates to a vibration generating motor. More specifically the present invention relates to vibration generating motors which enable easy use in cellular phones, pagers, entertainment game controllers and other consumer products requiring small and effective vibration generating motors.

2. Description of the Related Art

Referring now to FIGS. 8 and 9, a conventional vibration generating motor 1 includes a plurality of rotors 3, rotatable about a rotary shaft 2. A magnet (not shown) surrounds the plurality of rotors 3, as in known small-sized DC motors.

Each rotor 3 includes a rotary core 4, each having respective coil winding portions 4a, 4b, and 4c, as shown. Respective coils 5a, 5b, and 5c are wound upon respective coil winding portions 4a, 4b, and 4c, as shown.

During use, a DC voltage is applied to coils 5a, 5b and 5c by way of a spring(not shown), disposed on rotary shaft 2. Under the influence of the DC voltage, rotors 3 are driven by the interrelation of a magnetic flux (not shown) generated on coils 5a,5b and 5c and a magnetic flux of the magnet.

During assembly, a weight 6 is inserted and fixed between selected neighboring coil winding portions, (4a and 4c, as shown for example).

Weight 6 is specifically designed with a rectangularly columnar body 6a to fit specifically in the profile of the space formed between core winding portions 4a, 4c. A step 6b, projected in two directions from an end of columnar body 6a, is specifically designed to aid fitting in the profile space formed.

When weight 6 is inserted between coil winding portions 4a and 4c, step 6b contacts each winding portions 4a, 4c and weight 6 is thereby axially positioned therebetween. One end of weight 6 is fixed by clinching, or another similar operation, while an opposite end of weigh 6 is fixed in place by an adhesive such as a chloroprene rubber adhesive.

As noted above, during operation, rotors 3 are driven when respective coils 5a, 5b and 5c are energized. Since weight 6 is fixed between coil winding portions 4a and 4c, a center of rotational gravity of plurality of rotors 3 is deviated, in eccentric state, from a center axis of rotary shaft 2. Accordingly, due to rotation of rotors 3, conventional vibration generating motor 1 as a whole generates vibration.

Unfortunately, weight 6 in conventional vibration generating motor 1 is strongly fixed by an adhesive agent between coil winding portions 4a and 4c of core 4 to resist unplanned separation. This is detrimental to cost, speed, and efficiency, since in an a conventional assembling process a hardening furnace for hardening the strong adhesive agent is required and the hardening time necessarily lengthens the production process.

Consequently, the production cost of conventional motors is detrimentally expensive. As a further detriment, in conventional vibration generating motor 1 it is not easy to remove weight 6 from core 4 and thereby recycle used weights 6. This prevents or severely limits recycling and increases manufacturing waste.

It is also know that instead of the adhering process shown, it is possible to fix weight 6 between coil winding portions 4a and 4c by a welding process. Unfortunately welding processes, require welding equipment and a welding time, thus providing similar production disadvantages. As further disadvantages to a welding process, the heat generated during welding frequently deforms rotary cores 4, and recycling weight 6 is similarly prevented.

OBJECT AND SUMMARY OF THE INVENTION

It is an object of the present invention to provide a vibration generating motor which overcomes the detrimental designs provided above and provides reduced costs and increased production efficiencies.

It is another object of the present invention to provide a vibration generating motor which can be assembled in an easy manner with reliable attachment.

It is another object of the present invention to provide a vibration generating motor wherein an eccentric weight can be easily recycled.

It is another object of the present invention to provide a device which maximizes the available space between adjacent rotors while providing secure assembly and reliable operation.

Briefly stated, the present invention relates to a vibration generating motor providing simple and fast assembly, and ready recycling. A motor includes a plurality of rotors around a rotary shaft, a plurality of coil winding portions on respective rotors, and a coil on each respective coil winding portion. At least a two part weight is positioned between selected coil winding portions and has an seperably upper and lower part, allowing weight maximization at low cost while conserving space.

According to one embodiment of the present invention, there is provided a vibration generating motor comprising: at least a first, a second, and a third rotor operable about a rotary shaft, a coil winding portion on respective each the rotor, a plurality of coils wound on respective each the coil winding portion, a weight member, the weight member having a shape enabling selective and fixable positioning at a first position between two adjacent ones of the at least first, second, and third rotors during an assembly of the motor, the weight member including an upper part and a lower part, the upper part including an upper body and a first and a second upper flange, the lower part including a lower body and a first and a second lower flange, means for seperably coupling the upper and the lower parts of the weight member during the assembly, the upper body and the lower body contacting during the assembly, the first and the second upper flanges contacting a top surface of the coil winding portions on respective the two adjacent ones, and the first and the second lower flanges contacting a bottom surface of the coil winding portions on respective the two adjacent ones, whereby the means for separably coupling securely joins the weight member to the adjacent ones and enables a rapid assembly and secure operation of the motor.

According to another embodiment of the present invention there is provided a vibration generating motor, wherein: the means for separably coupling includes at least a first upper inserting opening on the upper body extending in an axial direction of the motor, the means for separably coupling further includes at least a first lower inserting opening in the lower body extending coaxial with the first inserting opening, and a the means for separably coupling including at least a first rivet member passing through the first upper and the first lower inserting openings and fixing the upper and lower parts together during the assembly, whereby an assembly time and an assembly cost are easily reduce for the motor.

According to another embodiment of the present invention there is further provided a vibration generating motor, wherein: the first upper inserting opening has a first diameter, an upper recess on a top surface of the upper part has a second diameter larger than the first diameter, the first lower inserting opening has a third diameter, a lower recess on a bottom surface of the lower part has a fourth diameter larger than the third diameter, and the upper and the lower recess receive a first and a second enlarged portion of the rivet during the assembly.

According to another embodiment of the present invention there is further provided a vibration generating motor, wherein: the means for separably coupling includes a locking hole portion axially positioned in the upper body, the means for separably coupling includes a locking protrusion axially extending from the lower body, the locking hole and the locking protrusion being coaxial, and the locking protrusion locking into the locking hole portion during the assembly and removably fixing the upper part and the lower part together.

According to another embodiment of the present invention there is provided a vibration generating motor, wherein: the weight member has a shape matching an interior surface of the two adjacent ones bounding the weight member, whereby the shape of the weight member maximizes a mass eccentric to the rotary shaft and within a circumference of the rotors.

According to another embodiment of the present invention there is a method of assembling a vibration generating motor, comprising the steps of: providing at least a first, a second, and a third rotor operable about a rotary shaft, providing a coil winding portion on respective each the rotor, providing a plurality of coils wound on respective each the coil winding portion, providing a weight member having an upper and a lower part, the upper part including an upper body and a first and a second upper flange, the lower part including a lower body and a first and a second lower flange, positioning the lower part at a first position between two adjacent ones of the at least first, second, and third rotors, positioning the upper part on the lower part in the first position and contacting a top surface of the upper body with a bottom surface of the lower body, and seperably coupling the upper part and the lower part, whereby the first and second upper flanges contact a top surface of the coil winding portions on respective two the adjacent ones, and the first and second lower flanges contact a bottom surface of the coil winding portions and securing the weight member to the adjacent ones.

According to an embodiment of the present invention, there is provided a vibration generating motor, in which each of the upper and lower parts of the weight has an opening formed in an axial direction of the rotary shaft and a rivet is inserted in the opening to fix the weight between the two neighboring coil winding portions.

According to another embodiment of the present invention, there is a vibration generating motor, in which two enlarged portions of the rivet are incorporated into two recesses formed in the upper and lower parts of the weight.

According to another embodiment of the invention, there is a vibration generating weight provided in which the upper and lower parts of the weight include an inserting hole and a protrusion on respectively opposing surfaces of the upper and lower parts mutually engageable during assembly and effective to join the upper and lower parts together.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
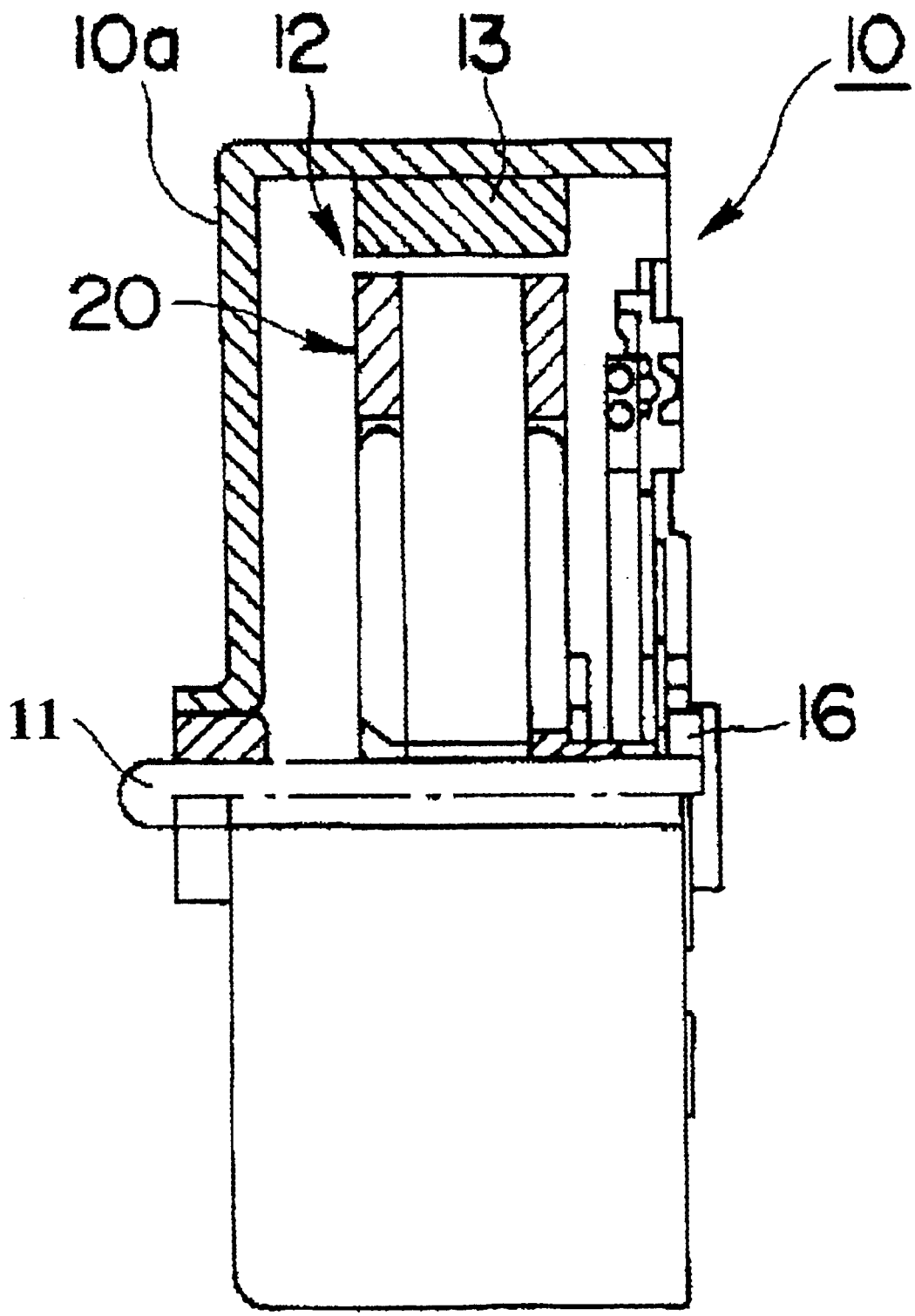
FIG. 1 is a partially cutaway section view showing a first embodiment of a vibration generating motor according to the present invention.
Figure 2:
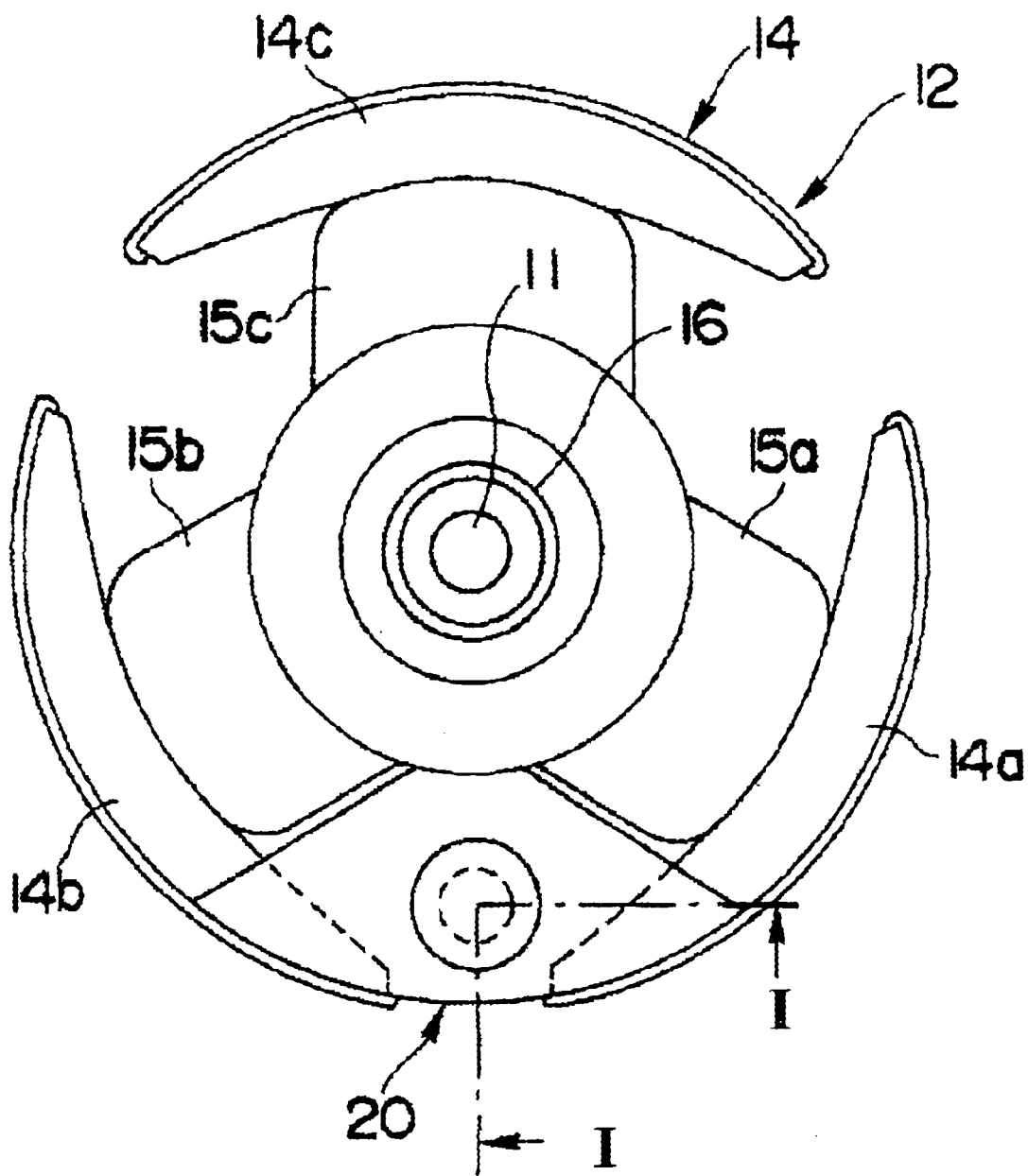
FIG. 2 is a front view of a plurality of rotors in FIG. 1.
Figure 3:
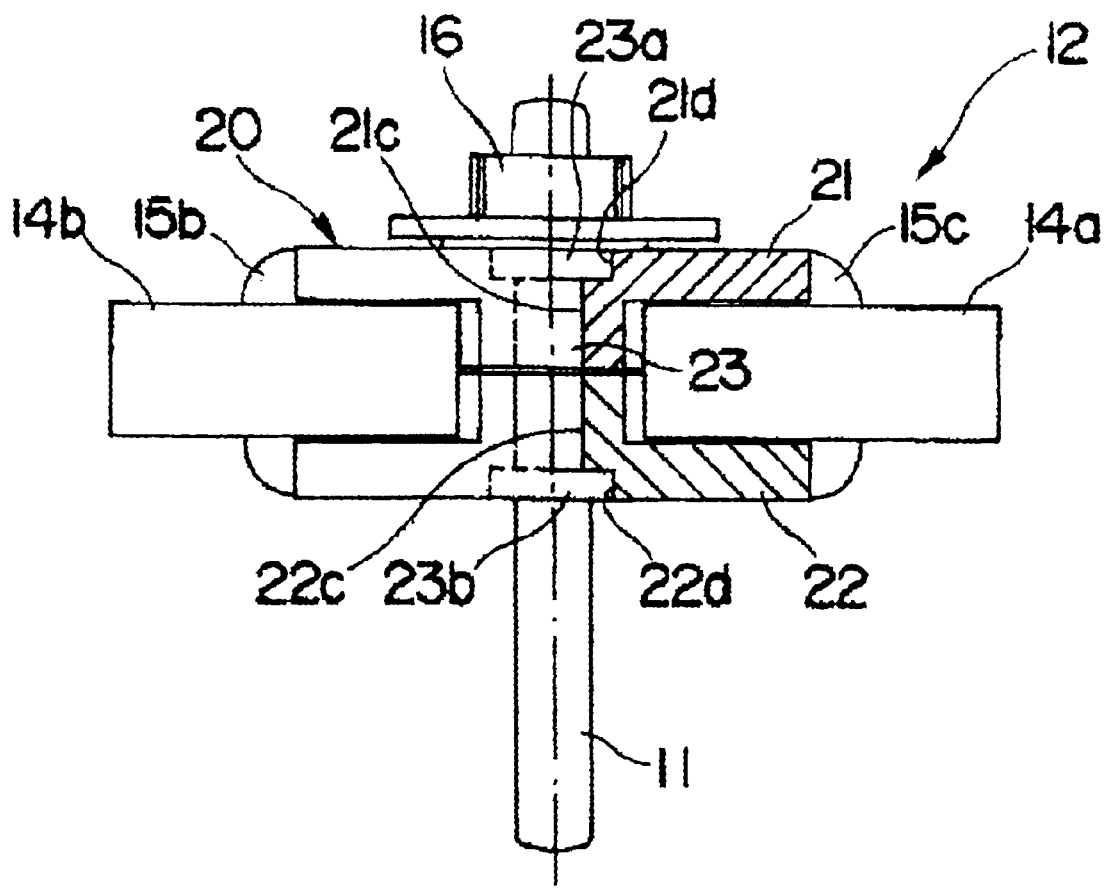
FIG. 3 is a partially cutaway section view taken along line I—I X in FIG. 2.

Referring now to FIGS. 1 to 3, a vibration generating motor 10 includes a plurality of rotors 12 rotatable about a rotary shaft 11 within a case 10a, and a magnet 13 positioned around the plurality of rotors 12.

Each rotor 12 constitutes a core 14. Vibration generating motor 10 includes at least three cores 14, each core 14 having respective winding portions 14a, 14b, and 14c, as shown.

Three coils 15a, 15b and 15c are wound on respective coil winding portions 14a, 14b and 14c. During operation, when certain DC voltage is applied to coils 15a, 15b and 15c, by way of a slop spring 16 disposed on rotary shaft 11, the plurality of rotors 12 are driven by the interrelation of a magnetic flux generated in coils 15a, 15b and 15c as well as a magnetic flux of magnet 13.

A weight 20 is inserted and fixed in a space formed between two neighboring coil winding portions, shown here as winding portions 14a and 14b.

Weight 20 is most preferably made of a high strength and weigh material e.g. a high gravity tungsten.

As shown in FIG. 3, weight 20 is divided into an upper part 21 and a lower part 22 relative to a center axis of rotary shaft 11.

Figure 4A:
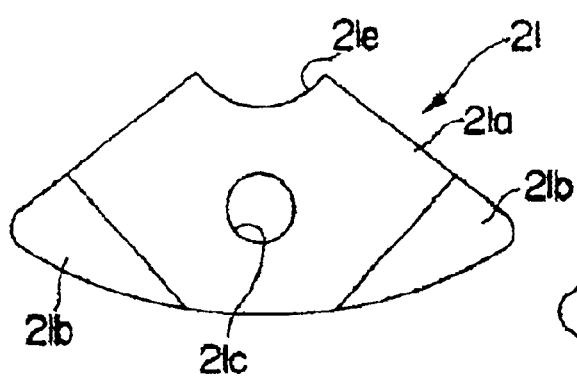
FIG. 4(A) is a rear view of an upper part of a weight used in FIG. 2.
Figure 4B:
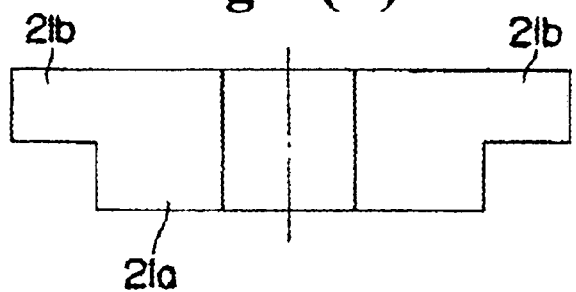
FIG. 4(B) is a plan view of the upper part of the weight in FIG. 4(A).
Figure 4C:
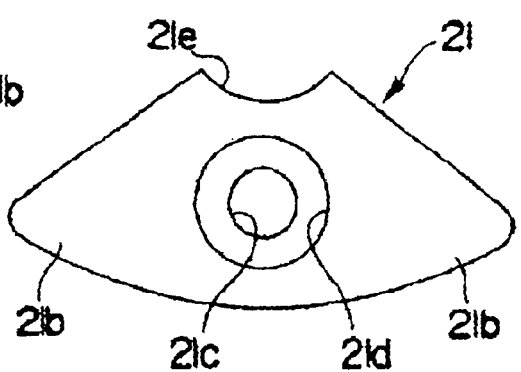
FIG. 4(C) is a front view of the upper part of the weight in FIG. 4(A).

Additionally referring now to FIGS. 4(A), 4(B), and 4(c), upper part 21 of weight 20 includes an upper body 21a, formed extended upwardly from a middle position of a center axis, and two flanges 21b, 21b respectively extended radially from upper body 21a. An inserting opening 21c penetrates axially into body 21a. A recess 21d, having a diameter greater than a diameter of inserting opening 21c, is on a top portion of upper part 21.

During assembly, when upper part 21 of weight 20 is inserted upwardly between selected coil winding portions (shown as coil winding portions 14a and 14b) of core 4, upper body 21a penetrates into a space defined and formed between coil winding portions 14a and 14b. Flanges 21b, 21b contact a top surface of two respective coil winding portions 14a, 14b, as shown.

During assembly, when joining upper and lower parts 21, 22 of weight 20, a rivet 23 is inserted into inserting opening 21c and an upper end 23a of rivet 23 is enlarged radially by clinching and suitably incorporated into recess 21d. Upper body 21a includes a cutaway portion 21e to avoid a conflict with a riser(not shown) of each rotor 12.

Figure 5A:
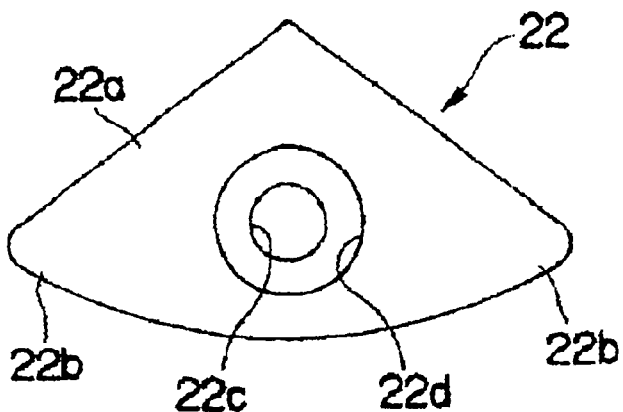
FIG. 5(A) is a front view of a lower part of the weight used in FIG. 2.
Figure 5D:
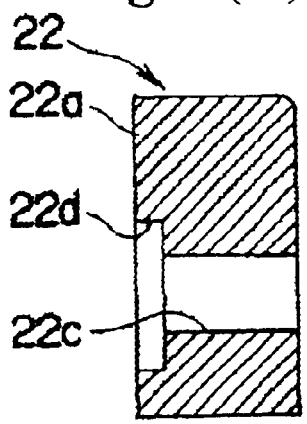
FIG. 5(D) is a vertical section view of the lower part of the weight in FIG. 5(A).
Figure 5B:
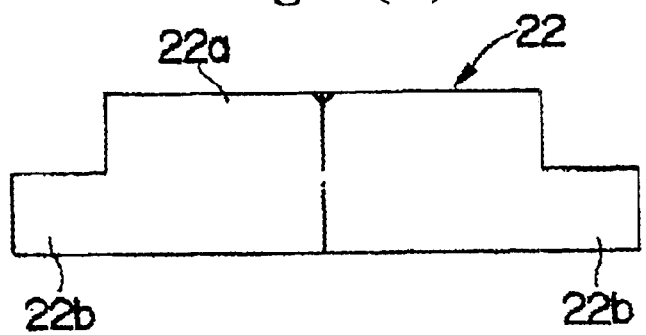
FIG. 5(B) is a plan view of the lower part of the weight in FIG. 5(A).
Figure 5C:
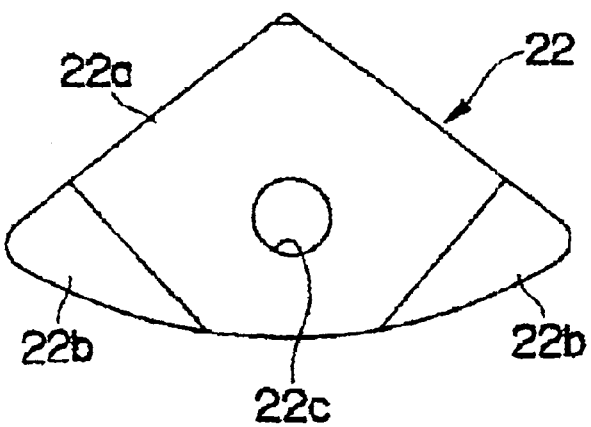
FIG. 5(C) is a rear view of the lower part of the weight in FIG. 5(A).

Referring to FIGS. 5(A), 5(B) and 5(C), lower part 22 of weight 20 includes a lower body 22a extended downwardly from a middle position of the axis, and two flanges 22b, 22b extending radially from an end of lower body 22a.

After or during assembly, an inserting portion 22c penetrates axially into lower body 22a. A recess 22d is formed adjacent inserting opening 22c, and has a diameter larger than a diameter of inserting opening 21c.

During assembly, when lower part 22 of weight 20 is inserted between coil winding selected winding portions 14a, 14b downwardly, lower body 22a penetrates into a space formed between coil winding portions 14a, 14b.

During assembly, flanges 22b, 22b contact a lower end of respective coil winding portions 14a, 14b. During fixing between upper and lower parts 21, 22 of weight 20, a means for coupling upper and lower parts 21, 22, such as rivet 23 (or a bolt or instant-glue(all not shown)), is inserted into inserting opening 22c and a lower end 23b is enlarged radially by clinching and suitably incorporated into recess 22d.

Under the embodiment described, flanges 21b, 21b of upper part 21 and flanges 22b, 22b, of lower part 22, hold coil winding portions 14a, 14b in an axial direction, and firmly fix weight 20 fixed between selected core winding portions 14a, 14b.

Under the present embodiment, when coils 15a, 15b and 15c of respective rotors 3 are energized by slip spring 16, rotors 3 are driven about rotary shaft 11. Since weight 20 is inserted and fixed between selected coil winding portions (here shown as winding portions 14a and 14b), a center of gravity of the plurality of rotors 12 is deviated eccentrically from a center of rotary shaft 11. Consequently, when rotors 12 are driven, vibration generating motor 10 as a whole generates vibration.

According to another beneficial aspect of the present invention, weight 20 is inserted and simply and quickly fixed by use of securing or coupling means, such as rivet 23, between coil winding portions 14a and 14b of each core 14. Thus, welding work is not necessary, and production costs and time for motor 10 can be reduced. Additionally, since it is easy to remove upper and lower parts 21, 22 of weight 20 by quickly removing rivet 23, it is possible to rapidly recycle used weights, thereby saving time, money, and reducing material waste.

Figure 6:
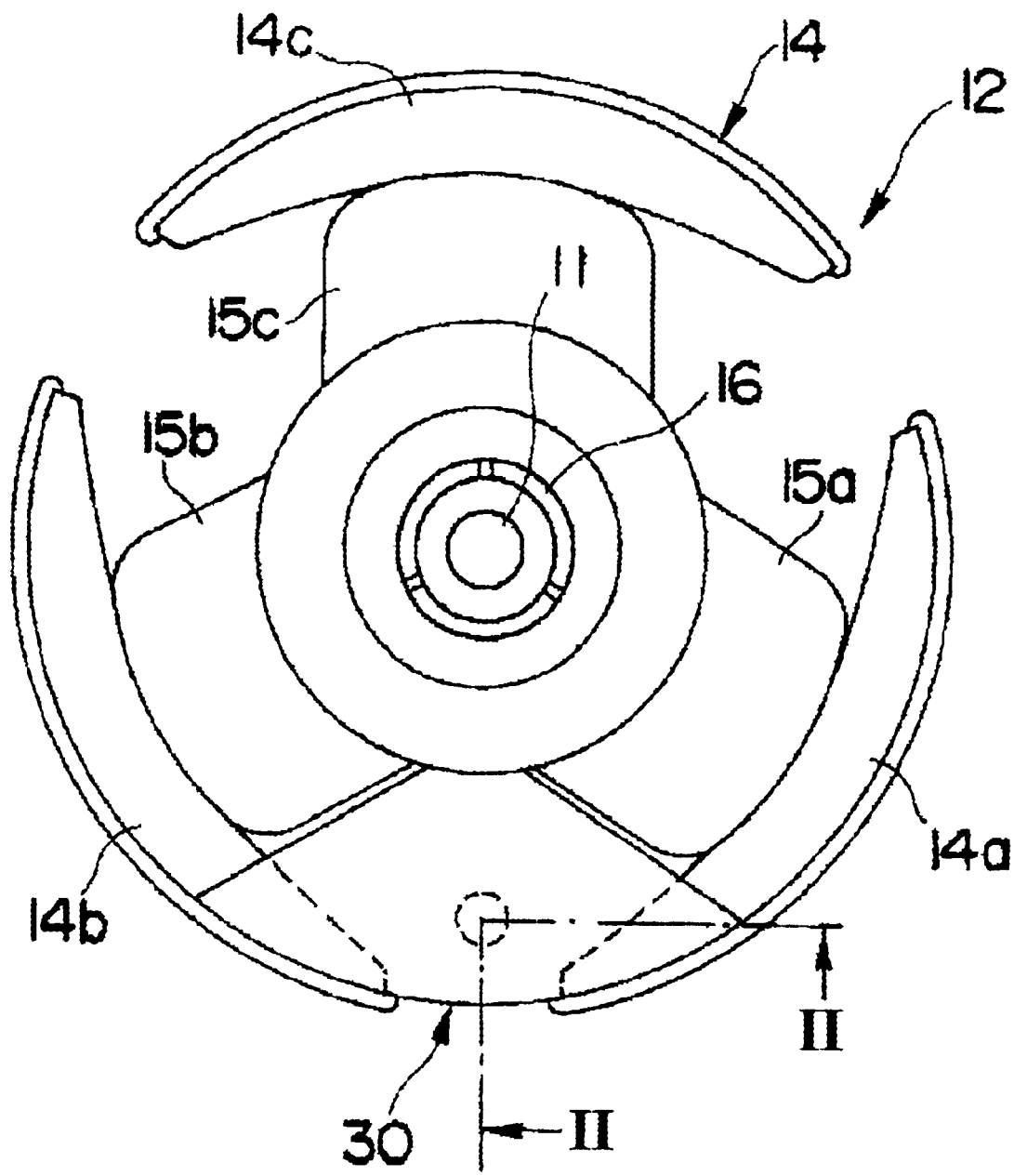
FIG. 6 is a front view of a plurality of rotors showing a second embodiment a vibration generating motor according to the present invention.
Figure 7:
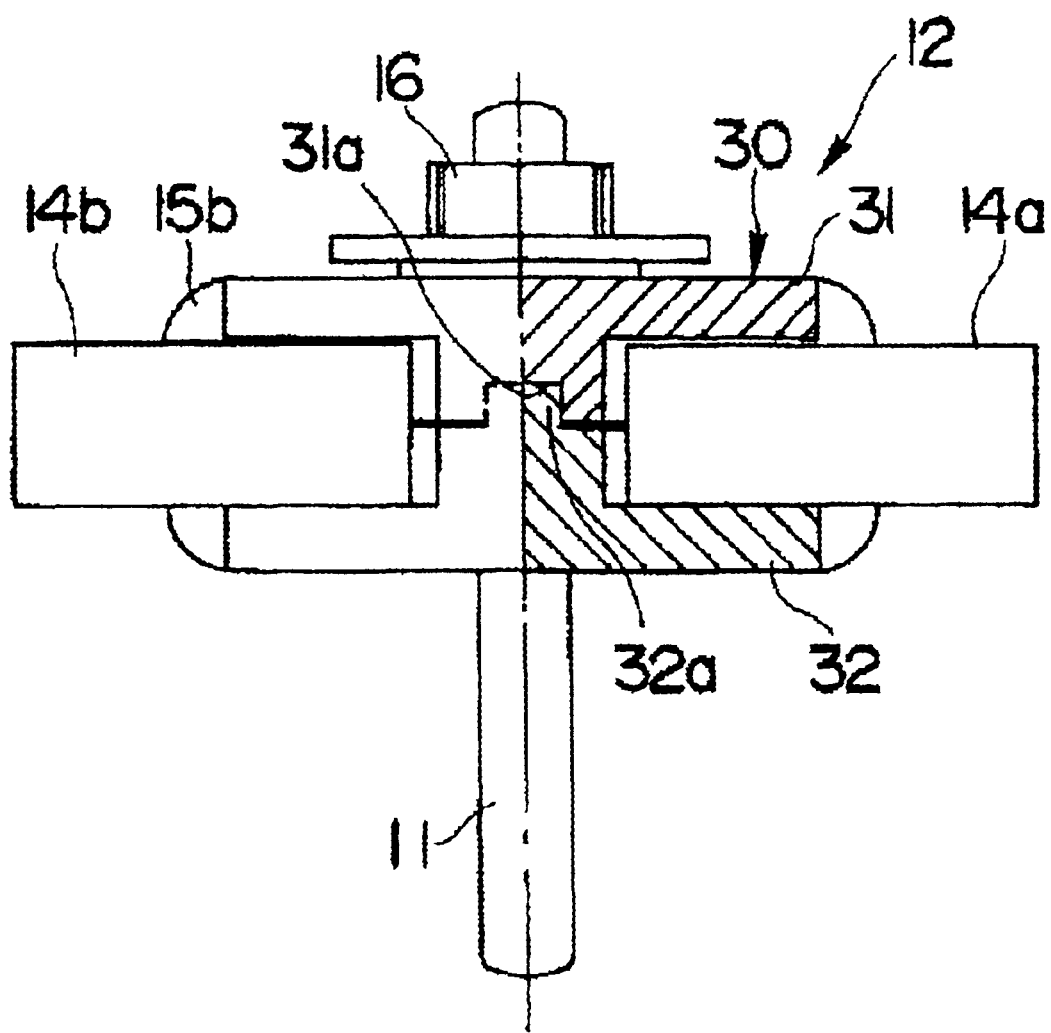
FIG. 7 is a partially cutaway section view of a plurality of rotors taken long line II—II in FIG. 6.
Figure 8:
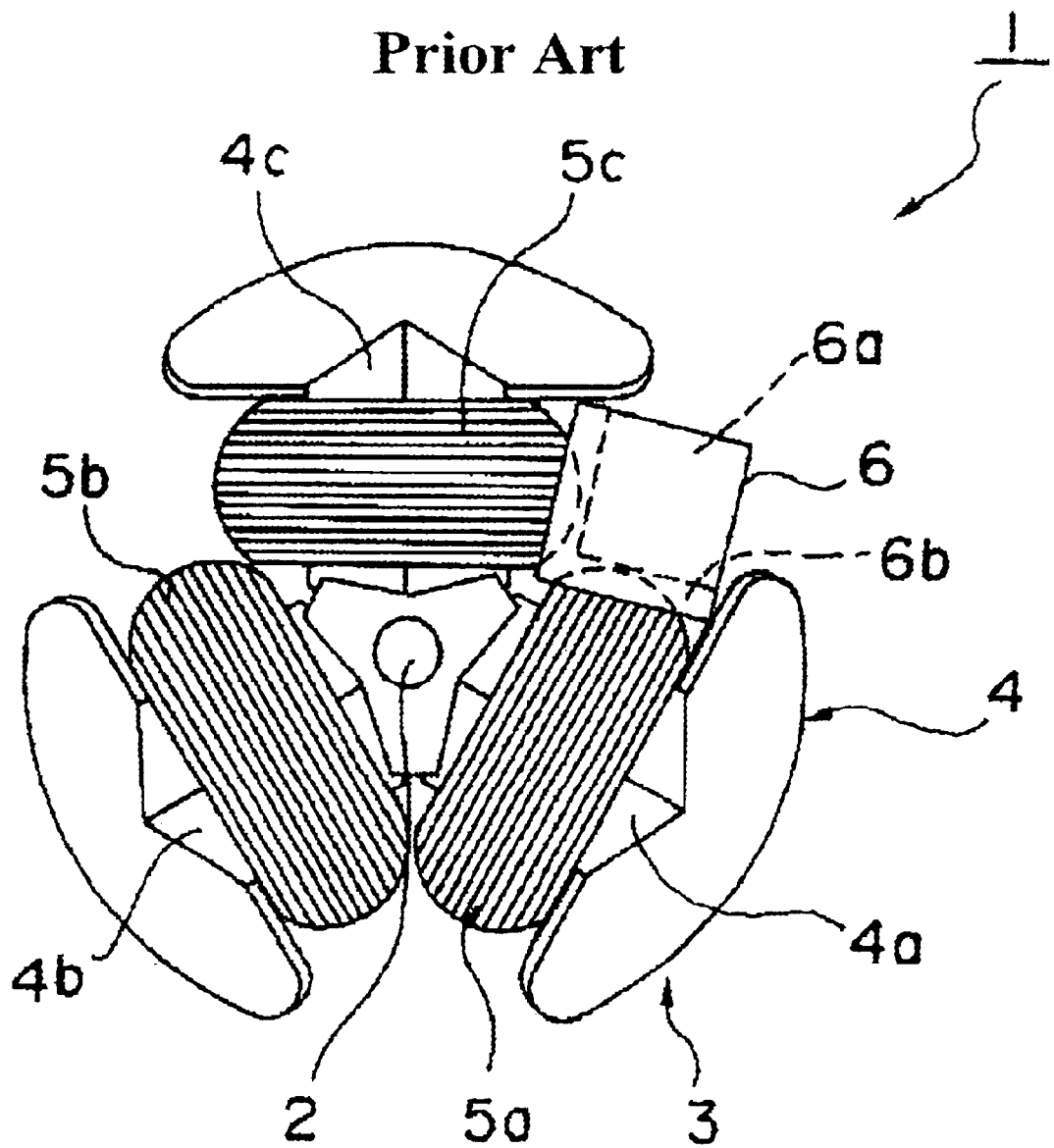
FIG. 8 is a schematic front view of a conventional vibration generating motor.
Figure 9:
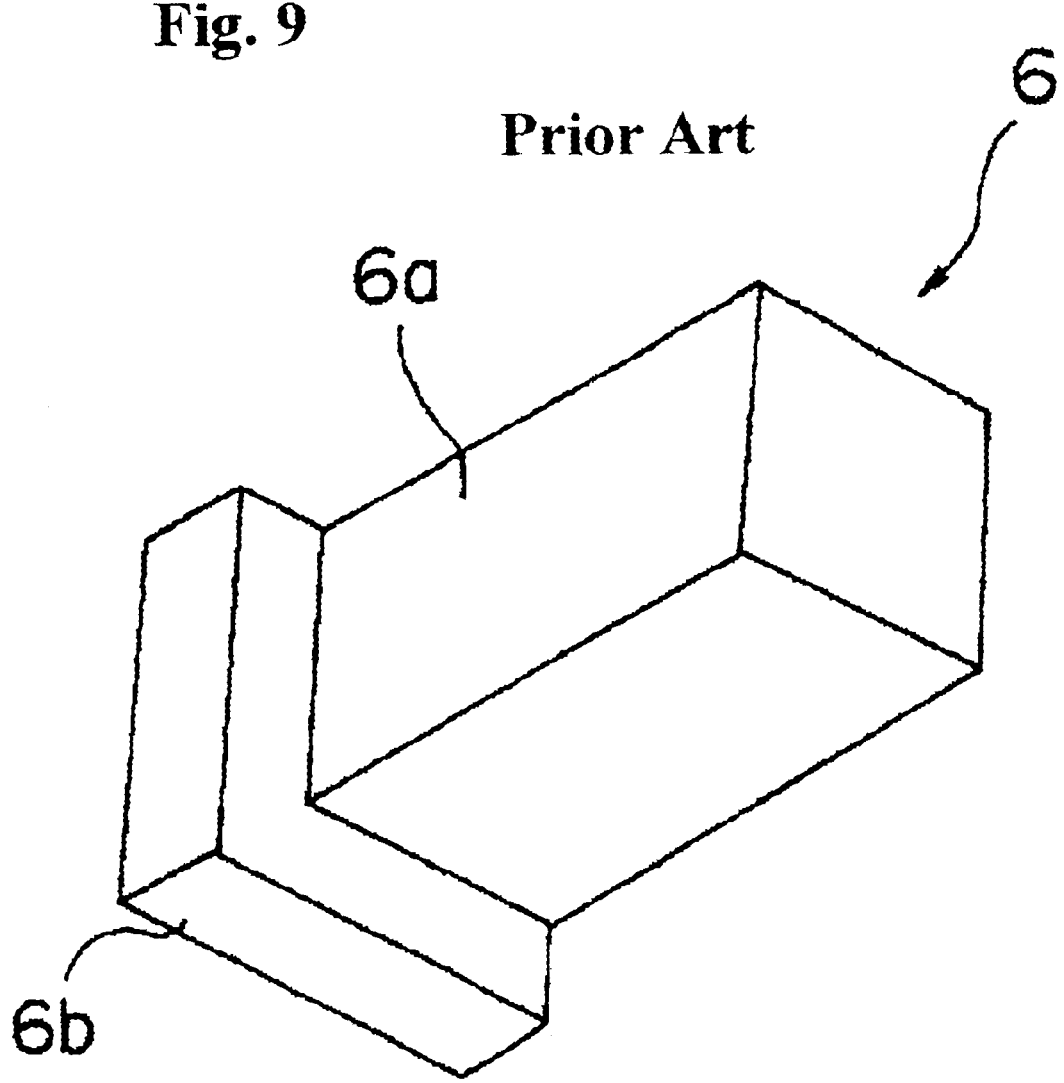
FIG. 9 is a schematic perspective view of a weight used in FIG. 8.

Additionally referring now to FIGS. 6 and 7, a second embodiment of the present invention includes an alternatively designed weight 30. Similar to the above-described embodiment, weight 30 is inserted and fixed in a space formed between two adjacent coil winding portions, (shown here as winding portions 14a and 14b). Weight 30 is constructed of a similar material as weight 20.

Weight 30 is divided into an upper part 31 and a lower part 32 at a middle position of an axis of the plurality of rotors 12.

Upper part 31 of weight 30 similarly includes body 21a and two flanges 21b, 21b and cutaway portion 21e, as described above.

Figure 4D:
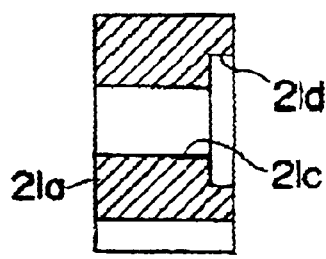
FIG. 4(D) is a vertical section view of the upper part of the weight in FIG. 4(A).

Upper part 31 includes a locking hole 31a, instead of inserting opening 21c and recess 21d of the first embodiment (shown in FIG. 4(D)).

Lower part 32 of weight 30 similarly includes body 22a and two flanges 22b, 22b, as described above.

Lower part 32 includes a locking protrusion 32a instead of inserting opening 22c and recess 22d (shown in FIG. 4(D)). Locking protrusion 32a has a shape designed to lock within locking hole 32b during assembly while allowing ready separation during a disassembly.

As designed, body 21 a of upper part 31 opposes body 22a of lower part 32, and allows easy locking of protrusion 32a can be easily locked into hole 32b. As similarly noted above, since neither adhesive nor welding is required, production cost and times may be reduced substantially. In the present embodiment, upper and lower parts 31, 32 of weight 30, after fixing, hold coil winding portions 14a, 14b in an axial direction, and fix weight 30 between coil winding portions 14a, 14b.

As in the first embodiment, when coils 15a, 15b and 15c of the plurality of rotors 3 are energized by slip spring 16, rotors 3 are operably driven about rotary shaft 11. Since weight 30 is fixed between selected coil winding portions (shown as winding portions 14a and 14b here), the center of gravity of rotors 12 is eccentric from the center of rotary shaft 11. Accordingly, during operation, motor 10, as a whole, generates vibration.

In the foregoing embodiments, the plurality of rotors comprise three coil winding portions, but this invention may be applied for a small-sized DC motor having two or four or more coil winding portions.

As discussed, weights 20, 30 are inserted and fixed and designed to correspond to the profile of a space formed between selected neighboring coil winding portions of the plurality of rotors 12. The outer surface of either selected weight 20, 30 contacts an inner surface of the respective two neighboring coil winding portions as well as the surface of the respective neighboring coils. Consequently, the design allows weight maximization utilizing the selected space between two neighboring coil winding portions. Thus, vibration may be maximized, while reducing or minimizing size and increasing reliability, speed, and economy.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims.

In the claims, means- or step-plus-function clauses are intended to cover the basic structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress opposite sides of at least one wooden part; in the environment of fastening wooden parts, a nail, a screw, and a bolt, or even adhesive, may be readily understood by those skilled in the art as equivalent structures and provide equivalent means to achieve the stated and intended function, as long as at least one structure is described.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A vibration generating motor, comprising:
   at least a first, a second, and a third rotor core operable about a rotary shaft;
   a coil winding portion on respective each said rotor core;
   a plurality of coils wound on respective each said coil winding portion;
   a weight member;
   said weight member having a shape enabling selective and fixable positioning at a first position between two adjacent ones of said at least first, second, and third rotor cores during an assembly of said motor;
   said weight member including an upper part and a lower part;
   said upper part including an upper body and a first and a second upper flange where said first and said second upper flange extend radially from said upper body;
   said lower part including a lower body and a first and a second lower flange where said first and said second flange lower extend radially from said lower body;
   means for separably coupling said upper and said lower parts of said weight member during said assembly;
   said upper body and said lower body contacting during said assembly;
   said first and said second upper flanges contacting a top surface of said coil winding portions on respective said two adjacent ones; and
   said first and said second lower flanges contacting a bottom surface of said coil winding portions on respective said two adjacent ones, whereby said means for separably coupling securely joins said weight member to said adjacent ones and enables a rapid assembly and secure operation of said motor.

2. A vibration generating motor, comprising:
   at least a first, a second, and a third rotor core operable about a rotary shaft;
   a coil winding portion on respective each said rotor core;
   a plurality of coils wound on respective each said coil winding portion;
   a weight member;
   said weight member having a shape enabling selective and fixable positioning at a first position between two adjacent ones of said at least first, second, and third rotor cores during an assembly of said motor;
   said weight member including an upper part and a lower part;
   said upper part including an upper body and a first and a second upper flange;
   said lower part including a lower body and a first and a second lower flange;
   means for seperably coupling said upper and said lower parts of said weight member during said assembly;
   said upper body and said lower body contacting during said assembly;
   said first and said second upper flanges contacting a top surface of said coil winding portions on respective said two adjacent ones;
   said first and said second lower flanges contacting a bottom surface of said coil winding portions on respective said two adjacent ones, whereby said means for separably coupling securely joins said weight member to said adjacent ones and enables a rapid assembly and secure operation of said motor;
   said means for separably coupling includes at least a first upper inserting opening on said upper body extending in an axial direction of said motor,
   said means for separably coupling further includes at least a first lower inserting opening in said lower body extending coaxial with said first inserting opening; and
   a said means for separably coupling including at least a first rivet member passing through said first upper and said first lower inserting openings and fixing said upper and lower parts together during said assembly, whereby an assembly time and an assembly cost are easily reduce for said motor.

3. A vibration generating motor, according to claim 2, wherein:
   said first upper inserting opening has a first diameter;
   an upper recess on a top surface of said upper part has a second diameter larger than said first diameter;
   said first lower inserting opening has a third diameter;
   a lower recess on a bottom surface of said lower part has a fourth diameter larger than said third diameter; and
   said upper and said lower recess receive a first and a second enlarged portion of said rivet during said assembly.

4. A vibration generating motor, according to claim 1, wherein:
   said means for separably coupling includes a locking hole portion axially positioned in said upper body;
   said means for separably coupling includes a locking protrusion axially extending from said lower body;
   said locking hole and said locking protrusion being coaxial; and
   said locking protrusion locking into said locking hole portion during said assembly and removably fixing said upper part and said lower part together.

5. A vibration generating motor, according to claim 1, wherein:
   said weight member has a shape matching an interior surface of said two adjacent ones bounding said weight member, whereby said shape of said weight member maximizes a mass eccentric to said rotary shaft and within a circumference of said rotors.

6. A method of assembling a vibration generating motor, comprising the steps of:
   providing at least a first, a second, and a third rotor core operable about a rotary shaft;
   providing a coil winding portion on respective each said rotor core;

providing a plurality of coils wound on respective each said coil winding portion;

providing a weight member having an upper and a lower part;

said upper part including an upper body and a first and a second upper flange;

said lower part including a lower body and a first and a second lower flange;

positioning said lower part at a first position between two adjacent ones of said at least first second, and third rotor cores;

positioning said upper part on said lower part in said first position and contacting a top surface of said upper body with a bottom surface of said lower body; and separably coupling said upper part and said lower part, whereby said first and second upper flanges contact a top surface of said coil winding portions on respective two said adjacent ones, and said first and second lower flanges contact a bottom surface of said coil winding portions and securing said weight member to said adjacent ones.

7. A vibration generating motor, according to claim 1, wherein said first and said second upper flanges and said first and said second lower flanges support said coil winding portions in an axial direction of said motor.

8. A method of assembling a vibration generating motor, according to claim 6, further comprising the steps of:
   radially extending said first and said second upper flanges from said upper body; and
   radially extending said first and said second lower flanges from said lower body.

9. A method of assembling a vibration generating motor, according to claim 6, further comprising the steps of:
   supporting said coil winding portion using said first and said second upper flanges and using said first and said second lower flanges, wherein said coil winding portion is supported in an axial direction of said motor.

* * * * *